Oct. 23, 1962
B. G. MANDELIK
3,059,995
PRODUCTION OF SULFUR DIOXIDE
Filed May 11, 1960
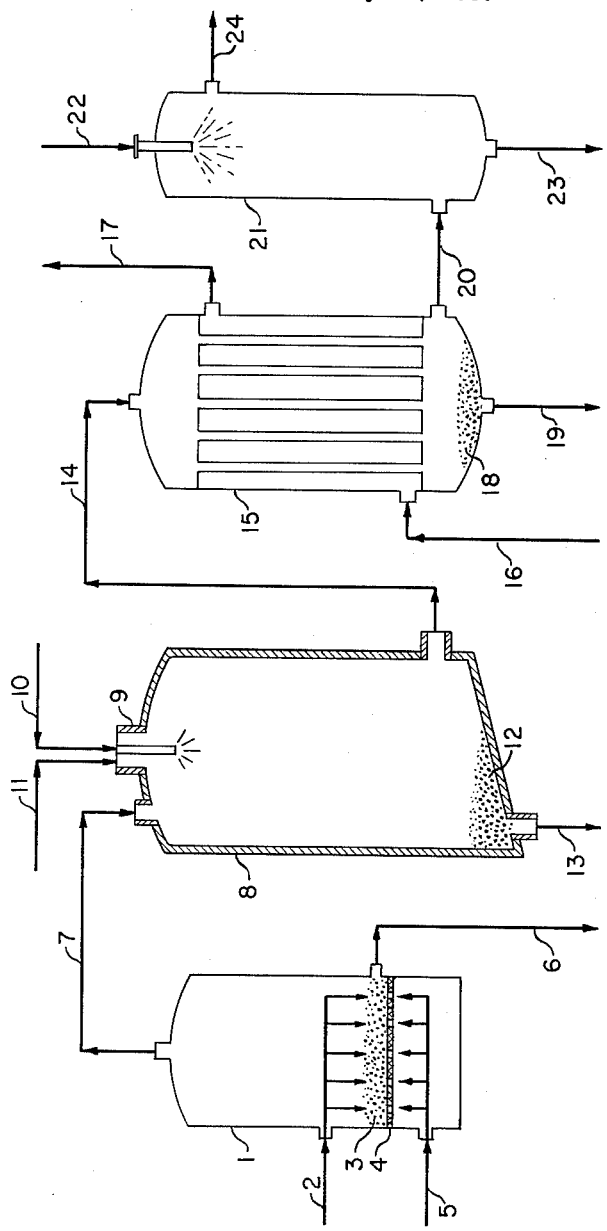
BERNARD G. MANDELIK
INVENTOR.
BY J. J. Chaboty
AGENT United States Patent Office 3,059,995
Patented Oct. 23, 1962

3,059,995
PRODUCTION OF SULFUR DIOXIDE
Bernard G. Mandelik, Pleasantville, N.Y., assignor to Chemical Construction Corporation, New York, N.Y., a corporation of Delaware
Filed May 11, 1960, Ser. No. 28,323
9 Claims. (Cl. 23—177)

This invention relates to processes such as sulfide ore roasting in which a dust-laden off-gas is produced which contains, in addition to sulfur dioxide, significant quantities of sulfur trioxide. A new method of handling such an off-gas has been devised, in which all sulfur values in the gas are converted to sulfur dioxide by heating the gas stream, and thereafter the dust content is readily removed by a simple liquid water scrub.

Sulfide ores are usually processed by either of two types of roasting, dead roast or sulfating roast. When the ore is a simple iron pyrites, with sulfur content as the sole element of value, dead roasting is employed. In this procedure relatively high roasting temperatures are employed of the order of 850° C. or higher, with only a slight excess of oxygen over stoichiometric requirement. Under these conditions the iron sulfide is converted to iron oxide and sulfur dioxide, with only a very slight formation of sulfur trioxide. The off-gas from dead roasting is thus readily scrubbed free of dust content by a simple water scrub, since sulfur dioxide is practically insoluble in water under these circumstances. Of course, the sulfur trioxide in the gas stream is readily absorbed, and is removed from the gas by the water scrubbing and thus represents a process loss. However, since only a small amount of sulfur trioxide is formed, this loss is of minor consequence. Thus a typical off-gas from a dead roast contains 10.8% sulfur dioxide, 0.3% sulfur trioxide, and 2.0% oxygen.

In contrast to this, a typical sulfating roast off-gas contains 8.0% sulfur dioxide, 1.4% sulfur trioxide and 5.2% oxygen. It is evident that water scrub of sulfating roast off-gas for solids removal would result in considerable loss of sulfur in the scrub water as sulfur trioxide. Sulfating roast is employed in treating sulfide ores which contain significant quantities of metal values such as copper or cobalt. In this case, the ore is roasted at a lower temperature between about 400° C. to 800° C., with considerable excess air. As a result, desirable metal values in the ore are converted to sulfates rather than oxides, and may be readily recovered from the roasted ore by leaching.

Since the off-gas from a sulfating roast contains important quantities of sulfur trioxide, dust removal is conventionally accomplished by the use of an electrostatic dust precipitator. However, this is an expensive unit of equipment. The installation of such a unit represents a major capital expense, particularly for smaller plants. Thus in some cases it has been found more economical to simply accept a sulfur trioxide loss and to directly scrub the sulfating roast off-gas with water, thus removing dust and sulfur trioxide. In these cases the roast is operated to provide maximum conversion of sulfide to sulfur dioxide rather than sulfur trioxide, however, such modifications are limited due to the requirement that the valuable metals content in the ore must be converted to sulfate rather than oxide. In some larger installations an impure sulfuric acid may be utilized in other processing. In these instances the off-gas is readily cleansed of dust content by scrubbing with aqueous sulfuric acid solution.

Usually a weak acid is employed for this purpose. The acid thus becomes more concentrated due to sulfur trioxide absorption, however, the acid also becomes contaminated since the dust removal aspect of the process results in considerable dissolving of dust into the acidic solution.

In the present invention, the off-gas derived from processes such as sulfating roast of sulfide ores and containing considerable sulfur trioxide as well as sulfur dioxide and entrained dust is processed in a novel manner. The off-gas is heated to a highly elevated temperature at which the sulfur trioxide is decomposed to sulfur dioxide and oxygen. This heating may be accomplished by external firing while the off-gas is passed through a tubular heater, however the heating is preferably accomplished by burning a combustible material within the gas stream with addition of further air if required. The preferred combustible is one which provides additional sulfur dioxide to the gas stream, thus hydrogen sulfide or refinery sludge acid are preferably employed to raise the off-gas temperature and decompose sulfur trioxide. However, other combustibles such as natural gas or fuel oil may be used.

The resulting hot gas stream, with virtually all sulfur values present as sulfur dioxide, is readily cleansed of entrained dust without sulfur loss by a simple water scrub. In most cases it is desirable to provide a heat recovery device such as a waste heat boiler prior to the water scrub, to partially cool the gas stream and recover usable high-temperature heat.

The process of the present invention has numerous advantages as compared to prior practice. The use of an electrostatic precipitator is avoided, which eliminates a large item of capital expense. In smaller installations, where sulfur trioxide content is presently wasted, the sulfur values may now be completely recovered. In addition, in these smaller installations a greater flexibility is provided since it now becomes possible to operate the sulfating roast at any desired conditions for maximum sulfating effect, without regard to the amount of sulfur trioxide formed. The burning of a sulfur-containing material such as hydrogen sulfide in the gas stream to raise the temperature of the gas stream thus eliminates sulfur trioxide, also results in increasing the final sulfur dioxide strength in the gas stream thus providing greater efficiency in subsequent gas stream usage for such purposes as conversion to sulfuric acid. In addition, the concept of burning a sulfur-containing material is also highly advantageous in that it permits the usage of certain low-acid high carbon refinery sludges, which up to now have either been discarded or otherwise wastefully disposed of.

It is an object of the present invention to process a gas stream containing sulfur dioxide, sulfur trioxide and entrained solid dust for complete recovery of sulfur values as sulfur dioxide.

Another object is to process such a gas stream in a manner which permits complete recovery of sulfur values as sulfur dioxide while allowing for dust removal by liquid scrubbing.

An additional object is to provide an improved and more economical process for the treatment of off-gas derived from the sulfating roast of sulfide ore.

Still another object is to provide a process for simultaneous usage of sulfating roast off-gas and sulfur-containing combustibles such as hydrogen sulfide and sludge acid, which accomplishes the removal of entrained dust from the gas in an improved and more economical manner.

A further object is to remove entrained solid dust from a gas stream containing sulfur values as sulfur trioxide in an improved manner which permits retention of all sulfur values in the gas stream.

These and other objects and advantages of the present invention will become evident from the description which follows. Referring to the FIGURE, sulfide ore roaster 1 is shown receiving ore feed via 2. The ore is fed onto roasting bed 3 supported by grates 4. Air is admitted via 5 and maintains combustion of the ore. In the case of sulfating roast, the top gas in the upper portion of roaster 1 will be at a temperature between about 400° C. to 800° C., while in the case of dead roast the gas temperature will be somewhat higher as previously discussed. The roasted ore is removed via 6 and passed to further processing as desired.

The top gas is removed via 7, containing usually from about 0.5% to 3% sulfur trioxide, with about 6% to 9% sulfur dioxide as well as entrained dust. The gas is passed into combustion furnace 8. This furnace may be internally lined with refractory material, since highly elevated temperature conditions are maintained inside furnace 8. Combustible material is admitted into furnace 8 through burner 9 as feed 10. Burner 9 typically consists of two concentric circular elements, with excess combustion air as required being admitted into the annular space via 11. The combustible feed 10 may consist partially or wholly of hydrogen sulfide, refinery sludge acid, natural gas, fuel oil or residual oil. Other suitable combustibles will obviously occur to those skilled in the art. An internal equilibrium temperature is maintained between about 900° C. to 1400° C. in the lower portion of furnace 8, which results in decomposition of the sulfur trioxide content of gas feed 7, yielding additional sulfur dioxide. A portion of the entrained solids in gas feed 7 may settle out in the lower portion of furnace 8, as shown at 12, and is removed via 13. This solid material is usually combined with roasted ore solids 6.

The highly heated gas stream, now contains practically all sulfur values as sulfur dioxide. Residual sulfur trioxide content is less than 0.1% and usually less than 0.05%. The gas is removed via 14 and preferably passed through waste heat boiler 15 in which the gas is partially cooled. Boiler feed water is admitted via 16 and usable steam recovered via 17. The hot gas stream may also deposit some solids inside boiler 15, as indicated at 18. These solids are removed via 19 and may be combined with roasted ore solids 6.

The partially cooled gas stream now leaves boiler 15 via 20 and is further cooled and scrubbed free of entrained solids in scrubbing tower 21. Water or other suitable scrubbing liquid such as dilute sulfuric acid or aqueous liquor is admitted into the top of tower 21 via 22. Water is of course preferred as a scrubbing liquid, since it minimizes such problems as corrosion, undesirable side reactions or solids formation, and gas stream contamination. Tower 21 may be partially or wholly packed with trays, ceramic forms or other internal means for providing increased gas-liquid contact. The scrubbing liquid, now containing solid dust separated from the gas stream, is removed from tower 21 via 23. The cooled gas stream, now free of entrained dust and rich in sulfur dioxide, is removed from tower 21 and passed via 24 to utilization in sulfuric acid manufacture or for other purposes.

An example of an industrial application of the process of the present invention will now be described.

*Example*

A pyrite-sulfide ore containing recoverable cobalt values was treated by means of a sulfating roast at 600° C. The final roasted ore contained cobalt in the form of cobalt sulfate, which was then readily recovered from the ore by leaching. The roast off-gas was removed at 600° C., and contained 180 s.c.f.m. (standard cubic feet per minute) of sulfur trioxide, together with 1000 s.c.f.m. of sulfur dioxide, 700 s.c.f.m. of oxygen, 11,000 s.c.f.m. of nitrogen and 3000 s.c.f.m. of water vapor. This gas stream was heated to 1000° C. by burning an acid gas containing 520 s.c.f.m. of hydrogen sulfide and 80 s.c.f.m. of carbon dioxide, and additional natural gas amounting to 70 s.c.f.m. In order to support this combustion, 800 s.c.f.m. of air was required. The acid gas and natural gas were burned within the stream of roaster off-gas, and converted all sulfur trioxide content of the roaster gas to sulfur dioxide while heating this gas stream to 1000° C. The resulting gas stream contained substantially 1700 s.c.f.m. of sulfur dioxide, and was cooled to 350° C. in a waste heat boiler. The cooled gas stream was then scrubbed for dust removal, and finally passed to a contact sulfuric acid plant.

It should be noted that the process of the present invention is applicable to other processes in which a gas stream containing sulfur trioxide and entrained solids is produced. Thus it has been proposed to treat pickle liquor by high temperature combustion, whereby iron sulfate is decomposed to yield iron oxide and a dusty off-gas containing sulfur oxides. It is evident that the process of the present invention is readily usable in such a process, where appreciable sulfur trioxide is formed and complete sulfur recovery is desirable. Further applications and modifications of the process of the present invention will occur to those skilled in the art.

I claim:

1. Process of sulfate roasting of sulfide ore with complete recovery of evolved sulfur values as sulfur dioxide which comprises roasting sulfide-containing ore at a temperature between about 400° C. to 800° C., removing a dust laden hot off-gas stream containing sulfur dioxide together with between about 0.5% to 3% sulfur trioxide, further heating said hot gas stream to a temperature between about 900° C. to 1400° C. by burning an added combustible material in said gas stream with an added stream of oxygen-containing gas, thereby decomposing a major portion of contained sulfur trioxide to sulfur dioxide and oxygen, and cooling said gas stream by contact with aqueous liquid scrub solution, whereby entrained dust is removed from said gas stream.

2. Process of claim 1, in which said aqueous liquid scrub solution is water.

3. Process of claim 1, in which said heated gas stream is cooled from an initial temperature between about 900° C. to 1400° C. to an intermediate lower temperature in heat recovery means, prior to said cooling with liquid scrub solution.

4. Process of claim 1, in which said hot gas stream is further heated by burning a sulfur-containing combustible in said gas stream.

5. Process of claim 4, in which said combustible is hydrogen sulfide.

6. Process of claim 4, in which said combustible is refinery sludge acid.

7. Process of converting sulfur values present in a process material into the sulfur dioxide component of a mixed gas stream free of sulfur trioxide and entrained solids which comprises oxidizing the process material by means of elevated temperature combustion, whereby a hot off-gas stream containing sulfur dioxide, sulfur trioxide, and entrained solids is produced, heating said off-gas stream to a higher temperature in the range of 900° C. to 1400° C. by burning an added combustible material in said gas stream with an added stream of oxygen-containing gas, whereby the sulfur trioxide content of said gas stream is substantially completely decomposed to sulfur dioxide and oxygen, cooling the gas stream, and scrubbing said gas stream with aqueous liquid scrub solution to remove said entrained solids.

8. Process of claim 7, in which said process material is a sulfide ore.

9. Process of claim 7, in which said aqueous liquid scrub solution is water.

References Cited in the file of this patent

UNITED STATES PATENTS

| | | |
|---|---|---|
| 1,678,630 | Bahr | July 31, 1928 |
| 1,807,528 | Hiatt | May 26, 1931 |
| 1,823,698 | Nordlander | Sept. 15, 1931 |
| 2,341,887 | Titlestad et al. | Feb. 15, 1944 |
| 2,545,389 | Somer et al. | Mar. 13, 1951 |
| 2,608,467 | Lewis | Aug. 26, 1952 |

OTHER REFERENCES

Thorpe: "Dictionary of Applied Chemistry," vol. V, 1916, pp. 298, 302 and 305.

Mellor: "Comprehensive Treatise on Inorganic and Theoretical Chemistry," vol. 10, 1930, p. 333.